W. C. TURNBULL.
Gas Purifier.
No. 58,002.  Patented Sept. 11, 1866.
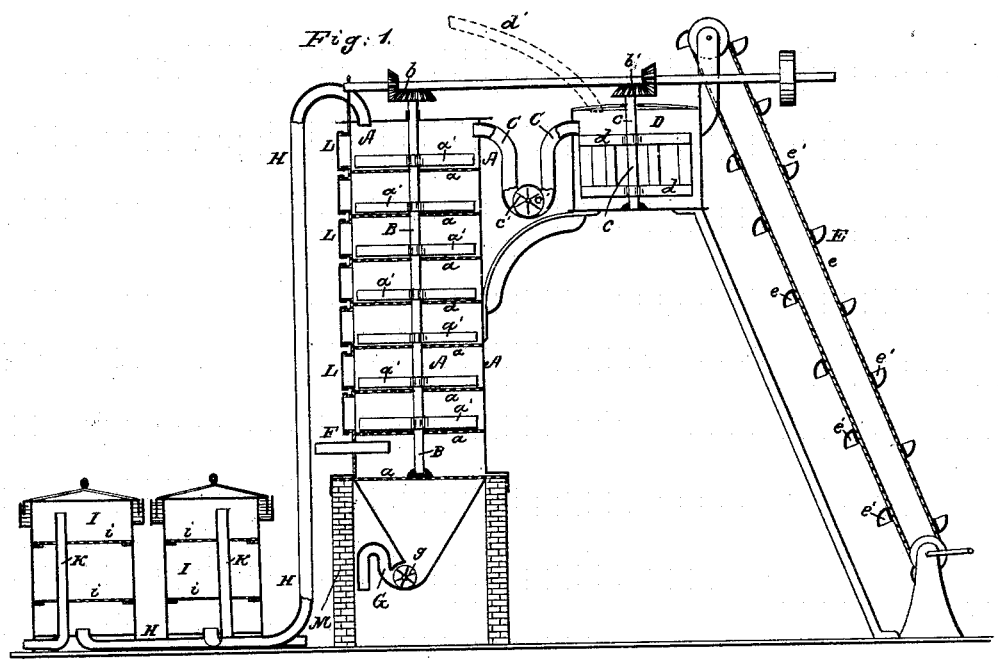
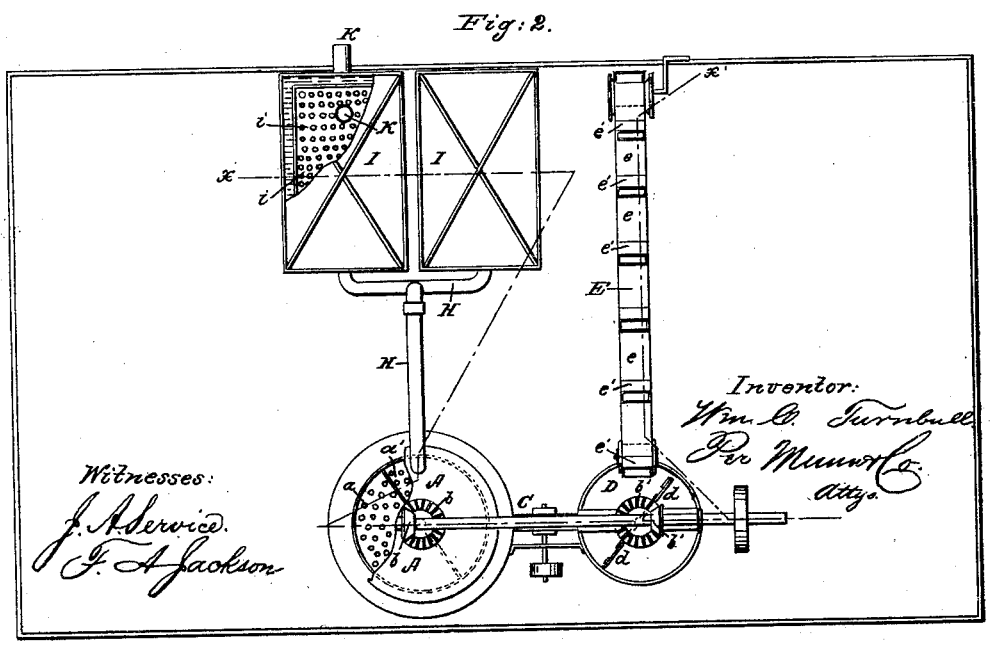

UNITED STATES PATENT OFFICE.

WILLIAM C. TURNBULL, OF NEW YORK, N. Y.

IMPROVED MACHINE FOR PURIFYING GAS.

Specification forming part of Letters Patent No. 58,602, dated September 11, 1866.

*To all whom it may concern:*

Be it known that I, WILLIAM C. TURNBULL, of the city and county and State of New York, have invented a new and useful Improved Machine for Purifying Gas; and I do hereby declare that the following is a full, clear, and exact description thereof, which will enable others skilled in the art to make and use the same, reference being had to the accompanying drawings, forming a part of this specification, in which—

Figure 1 represents a longitudinal vertical section of the apparatus, taken on a plane indicated by the line $x\,x$, Fig. 2. Fig. 2 is a plan or top view of the same, partly in section.

Similar letters of reference indicate like parts.

This invention relates to an improved method of purifying gas by means of an apparatus which is both self-feeding and self-discharging, and by which the gas is purified in a more economical and effectual manner than could ever be done heretofore; and the invention consists in constructing a tank into which slaked lime is conveyed by an elevator and in which the lime is mixed with water constantly streaming into said tank. The mixture is then conveyed by a pipe to a vertical iron cylinder, which is divided from top to bottom by a series of horizontal perforated plates, through which the mixture of lime and water descends from plate to plate in a fine shower, stirrers above each plate preventing any deposition on the plates. The gas in its impure state enters this cylinder at the bottom, and, passing through the perforated plates, meets the shower of milky lime, by which it is purified. The gas is then conveyed by a pipe which is attached to the upper part of the cylinder to the driers, which consist of two or more vessels made precisely in the same manner as the dry-lime purifiers now in use, on the perforated plates of which unslaked lime is placed, which, from its strong affinity to water, deprives the gas of all its hygrometrical moisture and renders it chemically dry. These vessels are used alternately, and the slaked lime which is taken from them may be used for the purifying of the gas. The lime and water mixture, saturated with the impurities of the gas, leaves the cylinder through a pipe, and runs off into close tanks, whence, after the settlement of the impure lime, the liquid portion runs off through a drain.

A represents a vertical iron cylinder which surrounds the vertical shaft B. Said shaft extends throughout the whole length of the cylinder, and is made to rotate by means of the bevel-gears $b$ or their equivalents. The cylinder A is divided from top to bottom into sections by a series of perforated metal plates, $a$, firmly secured to the walls of the cylinder. Above each one of these plates $a$ is secured to the shaft B an arm or stirrer, $a'$, which rotates with the shaft. The pipe C, which is in the shape of an inverted siphon, connects the top of the cylinder A with the tank D. A shaft, $c$, rotates within this tank by means of the bevel-gears $b'$, and drives the agitator $d$, which is keyed to the shaft $c$.

Slaked lime is fed into the tank D by an elevator, E, consisting of the endless apron $e$ and cups $e'$, and constructed as usual. A continuous stream of water also runs into the tank through the pipe $d'$. (Shown in red in Fig. 1.) The water and lime mix within the tank, and are stirred by the agitator $d$, and when the mixture has about the consistency of milk it flows off through the pipe C into the cylinder A. A small stirrer, $c'$, in the bend of the pipe C prevents any particles of lime from settling there.

When the mixture of lime and water enters the cylinder it falls upon the highest perforated plate $a$ and then descends from plate to plate in a fine shower. The stirrers $a'$ prevent any deposition on the plates, and consequently the holes in the latter are always kept open.

The impure gas enters the cylinder at the bottom through the pipe F, and, passing up, it meets the milky shower, by which it is purified. The lime and water mixture, when arriving at the bottom of the cylinder, is by that time saturated with the impurities of the gas, and is conducted by another inverted siphon, G, containing a small agitator, $g$, into close tanks. (Not shown in the drawings.)

The purified gas leaves the top of the cylinder through a pipe, H, and is conducted by the same to the driers. Said driers consist of two or more metal boxes, I, each one of which contains a series of perforated plates or shelves, $i$. Unslaked lime is placed upon these plates, and the gas, which enters the box at the bottom, passes up through the plates and is by the unslaked lime deprived of all its hygrometrical moisture and rendered chemically dry. The dry gas is conducted by the pipe $k$ to the meter.

The lime, after having been used in the driers, becomes slaked, and may then be used for the purification of the gas.

Man-holes L are applied to the wall of the cylinder above each perforated plate, so that the latter may be cleaned if necessary.

The cylinder is supported by brick-work M or any other substantial structure.

I claim and desire to secure by Letters Patent—

1. The combination of the tank D, pipe C, and agitators $d$ and $c'$ with the cylinder A, perforated plates $a$, and stirrers $a'$, for the purpose of purifying the gas, constructed and operating substantially in the manner described.

2. The combination of the cylinder A with the pipe H, boxes I, and perforated shelves $i$, for the purpose of drying the gas after its purification, substantially in the manner herein shown and described.

3. The application of unslaked lime for the purpose of depriving the purified gas of all its hygrometrical moisture, thereby rendering the gas chemically dry and increasing its illuminating power, substantially as herein described.

WM. C. TURNBULL.

Witnesses:
WM. F. McNAMARA,
ALEX. F. ROBERTS.